(12) United States Patent
Phillips et al.

(10) Patent No.: US 6,228,019 B1
(45) Date of Patent: May 8, 2001

(54) VALVE ASSEMBLY

(75) Inventors: Robert John Phillips, Honiton; Christopher John Stuckey, Wimborne, both of (GB)

(73) Assignee: Normalair-Garret (Holdings) Limited, Somerset (GB)

( * ) Notice: Subject to any disclaimer, the term of this patent is extended or adjusted under 35 U.S.C. 154(b) by 0 days.

(21) Appl. No.: 09/258,586

(22) Filed: Feb. 26, 1999

(30) Foreign Application Priority Data

Feb. 27, 1998 (GB) .................................................. 9804047

(51) Int. Cl.$^7$ .................................................. B64D 25/02
(52) U.S. Cl. ..................... 600/19; 137/596.17; 137/627.5
(58) Field of Search ........................... 137/596.17, 627.5; 600/19

(56) References Cited

U.S. PATENT DOCUMENTS

| | | |
|---|---|---|
| 3,779,280 | 12/1973 | Evans et al. . |
| 3,921,666 * | 11/1975 | Leiber ........................... 137/627.5 X |
| 4,190,081 * | 2/1980 | Coles ........................... 137/625.65 X |
| 4,566,868 | 1/1986 | Menzies . |
| 4,733,585 * | 3/1988 | Link et al. ................... 137/625.65 X |
| 4,742,989 | 5/1988 | Akagi . |
| 4,797,834 | 1/1989 | Honganen et al. . |
| 5,036,886 * | 8/1991 | Olsen et al. ..................... 137/635.65 |
| 5,179,977 | 1/1993 | Iwata et al. . |
| 5,349,983 * | 9/1994 | Ozarowski et al. ............. 137/487.5 |
| 5,536,232 * | 7/1996 | Farrell et al. .......................... 600/19 |
| 5,682,918 * | 11/1997 | Stoll et al. .................... 137/627.5 X |
| 5,711,507 | 1/1998 | Berget et al. . |

FOREIGN PATENT DOCUMENTS

| | | |
|---|---|---|
| 2 209 381 | 5/1989 | (GB) . |
| WO 93/25832 | 12/1923 | (WO) . |

* cited by examiner

*Primary Examiner*—Gerald A. Michalsky
(74) *Attorney, Agent, or Firm*—Marshall, O'Toole, Gerstein, Murray & Borun

(57) ABSTRACT

A valve assembly including an actuator and a valve, the valve including a valve body having first and second ports and a valve seat between the first and second ports, a valve member carried on a valve stem and the valve stem being moveable to move the valve member at least one of into or out of engagement with the valve seat to prevent or permit communication between the first and second ports and wherein the actuator includes a stepper motor the rotational movement of which is converted to linear movement of the valve stem by a transmission, the transmission being adapted to maintain the valve stem in a position to which it is moved by the operation of the actuator whereby the transmission means is a non back-derivable transmission.

21 Claims, 2 Drawing Sheets

VALVE ASSEMBLY

DESCRIPTION OF INVENTION

This invention relates to a valve assembly and more particularly but not exclusively to a valve assembly for use in controlling a parameter such as gas pressure or flow, in a life support system for a member of an aircrew of a high performance aircraft.

In a life support system for a pilot, one or more control valves are required to enable pressurised gas to be delivered to and from the G-suit, and the breathing means from a gas supply. The gas for the breathing means at least, may be supplied from an oxygen concentrating system or from a ceramic or other oxygen generating system. The gas for the G-suit is usually pressurised air.

In each case, it is highly desirable that gas is efficiently used.

DESCRIPTION OF PRIOR ART

Valve arrangements are known which include one or more valve members which selectively connect the breathing system i.e. breathing mask and counterpressure garment, or G-suit, to either a gas supply or to a vent means to allow inflation and deflation of the counterpressure garment/G-suit. However, due to design inadequacies, some known valve arrangements for this purpose, can during change over from inflation to deflation of the compensating garment, momentarily connect the gas supply to vent, thus wasting gas.

SUMMARY OF THE INVENTION

According to the invention we provide a valve assembly comprising an actuator and a valve, the valve comprising a valve body having first and second ports and a valve seat between the first and second ports, a valve member carried on a valve stem and the valve stem being moveable to move the valve member at least one of into or out of engagement with the valve seat to prevent or permit communication between the first and second ports wherein the actuator comprises a stepper motor the rotational movement of which is converted to linear movement of the valve stem by a transmission means, the transmission means being adapted to maintain the valve stem in a position to which it is moved by the operation of the actuator whereby the transmission means is a non back-driveable transmission.

For example, the stepper motor may comprise an output shaft having a threaded region, and the transmission means including a female threaded member carried on the shaft and moveable along the shaft as the shaft is rotated, and the transmission means further comprising means to couple the female threaded member to the valve stem.

If desired, the valve member may be moveable relative to the valve stem and biasing means, such as a spring, may be provided to bias the valve member into or out of engagement with the valve seat.

Although most conveniently, the biasing means comprises a spring although any other suitable means, mechanical or otherwise for applying a biasing force to the valve member may alternatively be provided.

The valve stem may carry a stop element which moves the valve member against the biasing means out of or into engagement with the valve seat respectively when the valve stem is moved by the stepper motor.

Thus the valve member may "float" on the valve stem. Any tendency there may be for the valve member to remain in the position to which it is biased by the biasing means is positively overcome as the stop element positively moves the valve member against the force of the biasing means when the actuator is operated. Any tendency there may be for the valve member to remain in the position to which it is moved by the stop element when the stop element is removed, can be overcome by providing for the biasing means to act between a reaction member carried on the valve stem, and the valve member, so that further movement of the valve stem will cause an increasing biasing force to be exerted on the valve member.

The valve member is preferably slideable relative to the valve stem and the valve stem may be moveable bi-directionally by the actuator.

So that the actuator does not have to exert any force against the fluid pressure within the valve, but only against the biasing means, the valve member may be mounted by or integral with a diaphragm or piston which is provided to close a chamber within the valve body, with the fluid pressure at one of the first and second ports being communicated to the chamber. Thus the valve is substantially pressure balanced by equal fluid pressure on each side of the diaphragm or piston.

Whereas the valve may be a simple open/closed type valve, if desired a third port may be provided and a second valve seat may be provided between the second and third ports, there being a second valve member engageable with the second valve seat to prevent communication between the second and third ports, and means to move the second valve member out of engagement with the valve seat to permit communication between the second and third ports, the second valve member being carried on and being moveable relative to a valve stem, and biasing means being provided to bias the second valve member into or out of engagement with the second valve seat. The stem may carry a stop element which moves the second valve member against the biasing means out of or into engagement with the second valve seat respectively when the valve stem is moved by an actuator.

If desired, the valve stems on which the first and second valve members are carried may be independently moveable by respective actuators, but preferably a less expensive and more compact arrangement is that the valve stems on which the first and second valve members are carried are connected or are integrally provided and moved by a common actuator.

Thus the valve stems may be moveable to a position in which both of the first and second valve members are urged into engagement with their respective first and second valve seats by the biasing means so that the first, second and third ports are all isolated from each other, and when the actuator moves the valve stems, only one of the first and second valve members is moved out of engagement with its respective valve seat depending upon the direction of movement of the valve stems to permit of communication between the first or third port and the second port, whilst the other of the valve members is maintained in engagement with its respective valve seat by its respective biasing means to maintain the third or first port respectively isolated from the first or third, and second ports.

When the actuator is operated to move the valve stems in an opposite direction, the first or second valve member may thus be moved by its respective biasing means back into engagement with its respective first or second valve seat to isolate the first or third port from the second port before the second or first valve member is moved by the stop element against the force of its respective biasing means out of engagement with the respective third or first port.

Again, to prevent the actuator having to move the valve stems against fluid pressure in the valve, desirably each of the first and second valve members is mounted by or is integral with a diaphragm or valve which is provided to close a respective chamber within the valve body, and the fluid pressure at the second port being communicated to each of the respective chambers.

The valve body may be arranged so that the first and third ports are arranged generally at one side of the valve body and the second port is arranged at an opposite side of the body although other arrangements are no doubt possible.

The valve assembly of the invention may be a control valve assembly adapted to control fluid pressure or flow in a system e.g. which requires to be pressurised and depressurised, wherein the first port is connected to a supply of pressurised gas, the second port to the system and the third port to a vent, whereby when the first and second ports are in communication the system is pressurised, and when the second and third ports are in communication the system is vented, and the valve preventing communication between the first and third ports.

One application for the valve assembly is in a system comprising a G-suit of a life support system for an aircrew member and/or a breathing system of a life support system for an aircrew member The invention will now be described with reference to the accompanying drawings in which:

DESCRIPTION OF THE PREFERRED EMBODIMENTS

Figure 1:
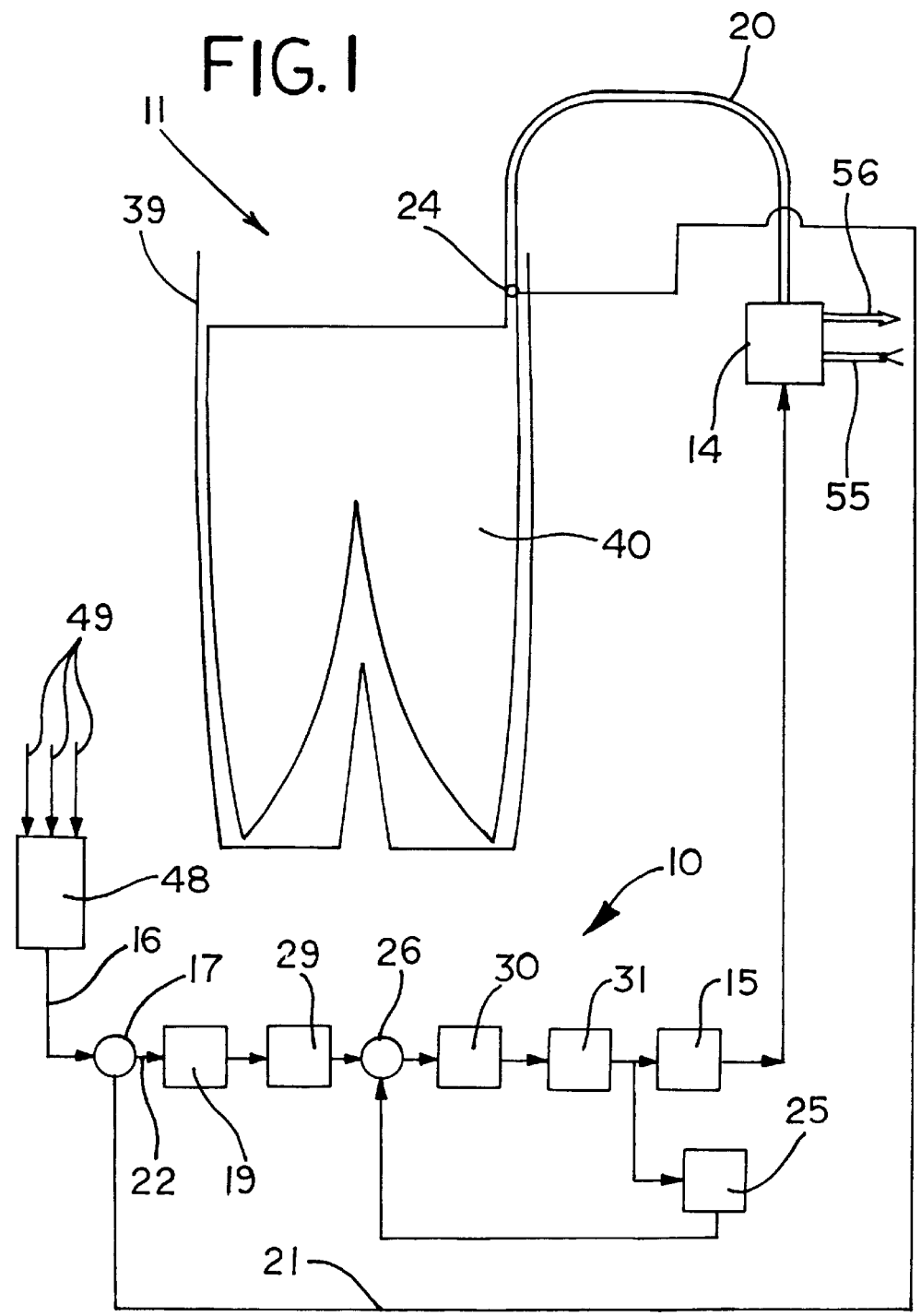
FIG. 1 is an illustrative view of a valve assembly of the invention in a life support system and control system.

Referring to the drawings there is shown in standard control notation, a control system 10 for controlling a fluid parameter i.e. the pressure in a G-suit 40 of a life support system 11 for an aircrew member of a high performance aircraft.

The pressure in the G-suit 40 is changed by the operation of a valve 14 which is operated by a stepper motor drive 15 which moves a moveable part of the effector 14 through a suitable transmission. The valve 14 and stepper motor 15 thus provide a valve assembly, although the two components 14,15 are shown in FIG. 1, separated.

An instructing signal is provided to the control system 10 along line 16 where it is fed to a comparator means 17. The comparator means 17 receives a further signal from a feedback loop along line 21. Depending on the difference between the instructing signal on line 16 and the feedback signal on line 21 i.e. the error, an input proper is then provided to the control system 10 along line 22.

The feedback loop includes a sensor 24 which senses the pressure in the G-suit 40 or more typically in a hose 20 connected to the G-suit 40. Thus the input on line 22 represents the discrepancy between the desired parameter value in the life support system 11, i.e. pressure in the G-suit 40, information about which is contained in the instructing signal on line 16, and the actual parameter value i.e. pressure in the G-suit 40 as sensed by sensor 24 and information about which is contained in the feedback signal on line 21.

This input proper on line 22 is then used to operate the valve 14 by driving the actuator 15 thereof. As the fluid pressure in the G-suit 40 changes in response to the operation of the valve 14, the feedback signal on line 21 will change, and so the input on line 22 will change. Thus in steady state conditions, the valve 14 would be operated so that a desired pressure in the G-suit 40 will be attained.

In a high performance aircraft, in practice, conditions rapidly change and thus the desired target G-suit 40 pressure may change rapidly as the aircraft manoeuvres.

A control system 10 which would rely only on the feedback signal in line 21 to control the valve cannot perform a fine control. This is because the signal from the comparator means 17 needs to be conditioned into a suitable control signal for the actuator 15, but without information about the physical response of the valve 14 to the control signal the effect of applying the control signal cannot be monitored. If a moveable part of the valve 14 were moved too far, or not far enough in response to a control signal, this would result in the parameter being varied by the valve 14, changing too much or not enough, which discrepancy could only be ascertained in response to the information from the sensor 24.

As stepper motor design improves, such motors can be stepped increasingly quickly. Hence it is desirable in order to achieve fine and responsive control of the valve 14 operation using a stepper motor actuator 15, to be able to determine the physical response of the moveable part of the valve 14 to the control signal at a rate comparable with the stepping speed of the stepper motor 15, so that the valve 14 operation can be controlled incrementally. Systems in which the position of a moveable part of the valve 14 is monitored by physical means, cannot react sufficiently rapidly for use with e.g. a stepper motor 15 which can be stepped perhaps a thousand times a second.

Accordingly there is provided a model effector 25 which contains reference information which may be used by the control system 10 more sensitively to control the operation of the valve 14. Also, using a model effector 25 rather than physically collecting data physically from valve 14, a less expensive and more compact arrangement is provided.

Thus the physical response of the valve 14 to a control signal can be determined without physically monitoring the position of the moveable part of the valve 14, but the valve 14 response can be modelled in the model effector 25.

The instructing signal on line 16 is obtained from e.g. a computer 48 which monitors changing conditions in an aircraft. The instructing signal may for example call for an increased pressure in the G-suit 40 to compensate for increasing G-force experienced by an air crew member. The instructing signal on line 16 will thus contain information relevant to a target pressure to be achieved in the G-suit 40.

The error between the target pressure and the actual pressure determined by sensor 24 is thus provided as the input on line 22. The input needs to be conditioned to convert the error signal into a signal appropriate to the stepper motor or other actuator 15, and this is achieved by feeding the input first to a compensator 19 which makes adjustments to, for examples only the gain and the phase of the input, so that the magnitude and phase of the input is matched to the system 10 downstream.

Second the compensated input is limited by an input limiter 29 to ensure that the input does not call for an valve 14 operation beyond its physical ability. For example, the input limiter 29 may ensure that the valve 14 is not operated so that the moveable part of the valve 14 is demanded to be moved beyond its range of movement.

Third, the compensated and limited input is compared in a comparator means 26 with reference information from the model effector 25, which information is indicative of the position of the moveable part of the valve 14 as described below. Thus an error signal is obtained, being indicative of the error between the actual position of the moveable part of the valve 14 and a desired position as demanded by the input.

Fourth, this error signal is fed to a calculating means 30 which converts the error signal into a command signal for the actuator 15. For example where the actuator 15 comprises a stepper motor, the calculating means 30 may convert the error signal into a command signal to command the actuator 15 to perform a number or further number of incremental movements i.e. steps.

Fifth, the command signal is finally conditioned in a controller 31. The controller 31 determines whether the command signal requires a number of incremental movements greater than a predetermined number. If a greater number of incremental movements than the predetermined number is commanded, the controller 31 issues a control signal to actuator 15 to cause a usually single, incremental movement of the moveable part of the valve 14; where the controller 31 determines that a lesser number of incremental movements than the predetermined number is commanded, the controller 31 issues no command signal to the actuator 15. The predetermined number of incremental movements may be determined by the ability of the control system 10 to perform meaningful control. For example although the error signal obtained in the comparator means 26 may indicate that the moveable part of the valve 14 is not quite at its desired position, further adjustment of the position of the moveable part may not result in any noticeable change in fluid pressure, and hence such movement would be ineffectual.

When a control signal is issued to the actuator 15 to achieve an incremental movement of the moveable part of the valve 14, the reference information in the model effector 25 is updated along line 28, to reflect the change of actual position of the moveable part of the valve 14 occasioned by the control signal, which updated information is then available for future comparison with the input.

In this way, the valve 14 is controllable incrementally and the iterative loop of the line 28, model effector 25 and line 33 from the model effector 25 to the comparator means 26, enables such incremental control at a rate generally as fast as the speed at which the actuator 15 can incrementally be operated. Thus the speed at which the actuator 15 can be operated accurately to bring the moveable part of the valve 14 to a desired position can be reduced compared with known control systems, so that the ability of the valve 14 to control the parameter e.g. gas pressure in the G-suit 40, is enhanced.

In its simplest form, the model effector 25 may be a simple counter to count the number of incremental movements the actuator 15 has been controlled to perform. However the model effector 25 may be more complicated to take account of for examples only, non-linear or other non-regular response of the actuator 15 to control signals and/or of non-regular response of the valve 14 to actuator 15 movement, over all or part of the range of movement of the moveable part of the valve 14, or temperature or pressure or the like dependent response. In this latter respect there could be a temperature or pressure or other sensor input to the model effector 25 from the actual valve 14 and/or actuator 15 or elsewhere so that the reference information is suitable updated in response to changing temperature or pressure or the like.

It will be appreciated that the control system 10 described has many advantages over a system which may physically determine the position of a moveable part of the valve 14. Particularly the performance of the control system 10 can readily be adjusted statically or dynamically, by making changes to the reference information in the effector model 25, and/or to the compensation of the input provided by the compensating means 19, thus requiring no hardware changes.

Whereas it has been usual practice previously to control the pressure in an aircrew breathing system and in an air crew G-suit together, utilising the present invention enables independent control of these functions more readily to be performed.

The life support system 40 for an aircrew member 39 of a high performance aircraft comprises a G-suit 40 adapted to be worn about a lower portion of the body to which air may be applied to permit the G-suit 40 to be inflated to compensate for G-forces to which the aircrew member 39 is subjected as the aircraft manoeuvres.

The air is supplied along a supply hose 20 from the control valve 14. The control valve 14 is operative either to provide pressurised gas to the hose 20 when it is desired to inflate the G-suit 40 or to vent gas from the G-suit 40 when it is desired to deflate the G-suit 40.

The on-board computer 48 which provides the instructing signal for the control system 10 is responsive to a plurality of inputs 49 provided by sensors on the aircraft or aircrew, to determine the actual or predicted aircraft condition. Thus the computer 48 is responsive to actual and/or predicted aircraft manoeuvres and/or aircrew condition.

The computer 48 may also provide an instructing signal to a control system for controlling a valve which may be substantially the same as valve 14, which is operated to inflate and deflate a counterpressure garment of a breathing system of the life support system 11, to a breathing regulator, oxygen producing apparatus and otherwise as desired. Preferably the breathing system and G-suit 40 are controlled independently by computer 48.

Figure 2:
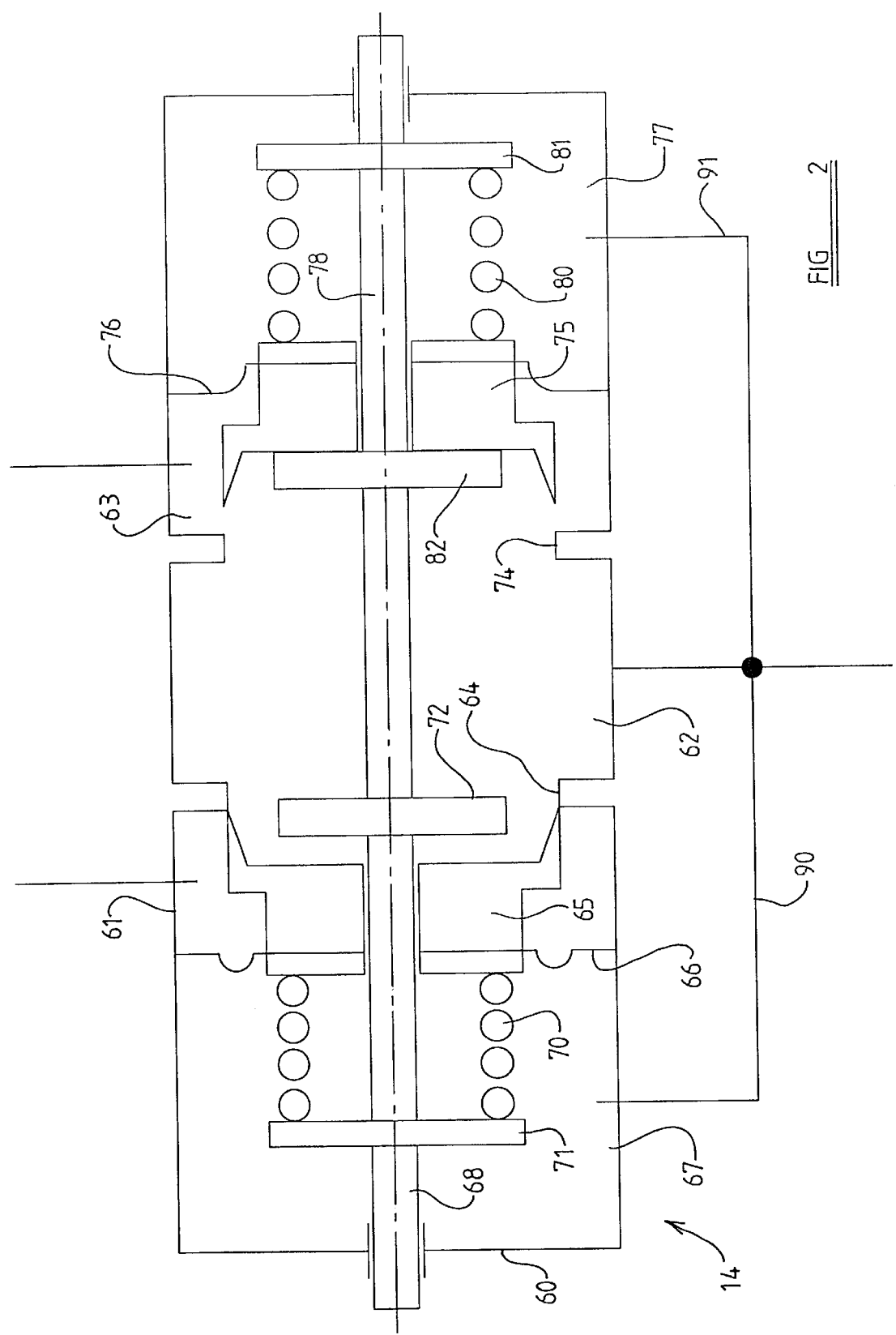
FIG. 2 is an illustrative view of the valve of the valve assembly shown in FIG. 1.

Referring now to FIG. 2, the valve 14 will now be described. In this example the valve 14 performs the dual functions of connecting the G-suit 40 to a supply of pressurised gas 55 to inflate the G-suit 40, and to a vent 56 to permit of deflation of the G-suit 40. However in another arrangement, these two functions may be performed by a pair of valves operating in tandem as will be appreciated from the description below.

The valve 14 comprises a valve body 60 comprising first 61, second 62 and third 63 ports, the first 61 and third ports 63 being provided at one side of the body 60, and the second port 62 at an opposite side of the body 60.

A first valve seat 64 is provided between the first 61 and second 62 ports with which a first valve member 65 is engageable to close communication between the first 61 and second 62 ports. The first valve member 65 is mounted by a diaphragm 66 which closes a first chamber 67 within the valve body 60. Alternatively the valve member 65 may be integral with the diaphragm 66 or mounted or integral with a piston which closes chamber 67. The first valve member 65 is also slidable on a valve stem 68 within the body 60 which valve stem 68 is moveable by an actuator comprising a stepper motor 15 (see FIG. 1) which is operated by a control signal from the control system 10.

The first valve member 65 is biased into engagement with the first valve seat 64 by a biasing means comprising in this example a coil spring 70, although another biasing means may be provided as desired. The spring 70 bears at one end on a reaction element 71 comprising a stop carried on the valve stem 68, and the spring 70 bears at its opposite end on the first valve member 65. Alternatively, the reaction element 71 may be provided by the body 60 or elsewhere, and need not bear directly on the valve member 65.

The valve stem 68 is connected to the actuator stepper motor 15. Preferably, the output shaft 92 of the stepper motor 15 is threaded, and carries a female threaded member 94 which moves along the output shaft 92 as the output shaft is rotated. The female threaded member is coupled to the valve stem so that the stepped rotational movement of the output shaft is converted to incremental linear movements of the valve stem 68.

Thus by stepping the motor 15, the valve stem 68 can accordingly be positioned, but by virtue of the ball screw transmission, the valve stem 68 cannot readily be back driven e.g. by pressure differentially acting on the valve member 65, so that the valve stem 68 is maintained in a position to which it is moved by the operation of the stepper motor 15, and at least when the valve member 65 is in engagement with the stop element 72 as described below, the valve member 65 is maintained in the position to which it is moved by the stepper motor 15 and transmission means.

As shown in FIG. 2, the valve stem 68 has been moved by the stepper motor 15 to the right. The only effect this has first valve member 65 is to increase the biasing force applied to the first valve member 65 to urge the first valve member 65 into tighter engagement with the first valve seat 64.

When it is desired to disengage the first valve member 65 from the first valve seat 64 to permit of communication between the first 61 and second ports 62, the valve stem 68 is moved by the stepper motor 15 to the left as seen in the drawings. Because the first valve member 65 is slidable on the valve stem 68, the first valve member 65 is retained in engagement with the first valve seat 64 by the spring 70 until a first stop element 72 carried by valve stem 68 engages the first valve member 65 to move the first valve member 65 against the force of the spring 70.

Preferably the first valve seat 64 and the first valve member 65 are designed so that the flow of gas from the first port 61 which is connected to the supply of pressurised gas, to the second port 62 which is connected to the G-suit 40 is metered so that small valve stem movements achieved by stepping the motor 15 as the valve stem 68 moves to close the valve, have a controlled effect on gas flow and so the pressure to which the G-suit 40 can be pressured, can be accurately controlled.

In this example, the first valve stem 68 is integral with or may be connected to a second valve stem 78 which is thus moved with first valve stem 68 by the stepper motor 15. The second valve stem 78 carries a second reaction element 81 on which one end of a second spring 80 bears, the other end of the spring 80 bearing on a second valve member 75 which is slidable on the second valve stem 78. The second valve member 75 is operable when engaged with a second valve seat 74 within the valve body 60 to prevent communication between the second 62 and third ports 63.

The second valve member 75 is shown in FIG. 2 lifted out of engagement with the second valve seat 74. This has been achieved by moving the second valve stem 78, with the first valve stem 68 to the right until a second stop element 82 carried on the valve stem 78 engages the second valve member 75 to move the second valve member 75 against its respective spring 80. When the second valve member 75 is clear of the second valve seat 74, pressurised gas in the G-suit 40 is vented to third port 63. Preferably again the second valve member 75 and second valve seat 74 are designed for a metered gas flow so that the pressure in the G-suit 40 can finely be controlled upon small precise stepped movements of the valve stem 78 under the control of the control system 10.

Of course by arranging the first 72 and second 82 stop members along the valve stems 68/78 more closely than the spacing between the first and second valve seats 64/74 as shown, it can be arranged that communication between the first 61 and third 63 ports is always prevented, so as to minimise gas wastage.

By virtue of the drive 15 being a stepper motor, the valve stems 68/78 can accurately be moved to provide for desired pressurisation/depressurisation of the G-suit 40, again with minimum gas wastage, in response to an operating signal to the drive 15.

The second valve member 75, like the first valve member 65 is mounted in the valve body 10 by a diaphragm 76 (or a piston), (but may be integrally provided with the diaphragm 76) which closes a second chamber 77 within the valve body 60.

Each of the first and second chambers 67/77 is connected via a respective line 90/91 to the second port 62, or at least to a zone of the valve 14 or to a conduit from the valve 14 which is at substantially the same pressure as the respective first 61 or third 63 port to which the second port 62 is connected. Thus the pressure behind the two diaphragms 66 and 76 in the chambers 67 and 77 are always equal to each other and to the pressure on the valve members 65 and 75. Thus the drive 15 when operated does not need to overcome any gas pressure in order to move a valve member 65 or 75, which also facilitates accurate control.

In the event that there is any tendency for either of the valve members 65 or 75 to remain in engagement with a respective valve seat 64 or 74, because the respective stop element 72 or 82 is brought positively into engagement with a respective valve member 65 or 75, there is no risk of the valve member 65 or 75 becoming jammed in a closed position.

Also, if there is any tendency for the either of the valve members 65,75 to remain in a disengaged position, increasing valve stem movement will cause an increasing biasing force to be applied to the respective valve member as the respective spring 70 or 80 compresses. Eventually, the respective reaction element 71 or 81 would positively engage the valve seat 65 or 75 to close the valve if the valve member 65 or 75 has not by then properly engaged its respective seat 64 or 74.

Various modifications may be made to the valve 14 without departing from the invention.

For example, instead of a pair of stop elements 72, 82 a single stop element may be provided although greater stem movement range may be required so that the stop element can operate both valve members 65 and 75. Instead of springs 70, 80 some other suitable biasing means may be provided. The valve stems 68 and 78 may be independently actuable by independent drives although the arrangement described is preferred as this is less expensive and more compact and may more readily minimise the risk of gas wastage. Thus each of the valve members 65 and 75 may have underlap and the double valve is closed centred.

The diaphragm or piston mounting of the valve members 65 and 75 is an optional arrangement and need not be provided in another arrangement.

The first 61, second 62 and third ports 63 may be arranged otherwise than described if desired.

A valve such as valve 14 shown in and described with reference to FIG. 2 has many applications alternative to a G-suit 40 of the life support system 11 described e.g. for controlling the gas pressure in a counterpressure garment of a breathing system of the life support system 11. In another application the valve 14 may be otherwise controlled than by the method and control system 40 described with reference to FIG. 1.

Thus whereas in the example described, the arrangement is such that the inlet and outlet ports 61,62,63 are always isolated from one another (closed centred), in another arrangement the inlet 61 and vent 63 ports could be arrange both to have overlaps so as always to be in communication with each other and/or with the outlet port 62.

Instead of the valve members 65,75 comprising "knife-edge" valve members as shown in the drawings, these may be provided by one or more valve spools. Thus the valve 14 may be adapted for controlling the pressure and/or flow of gas, liquid or any other fluid.

Where the valve of the invention is a simple two port valve, the valve member 65 need not be moveable relative to the valve stem 68, and the spring 70 need not be provided.

Even where the valve 14 is a double tandem valve as described, one or both of the valve members 65, 75 may be immovable on the respective valve stems 68, 78 although the arrangement described above when both are moveable on their stems 68, 78 and spring biased, is preferred.

In another arrangement, some other means for connecting the rotational stepper motor 15 output shaft movement to incremental linear movements of the valve stem or stems 68, 78 may be provided, to the ball screw arrangement described.

What is claimed is:

1. A life support system, comprising:

a pressure suit;

a gas supply source; and a valve assembly for controlling the pressure in the pressure suit by communicating gas between the gas supply source and the pressure suit, the valve assembly including:

a valve body having a first port connected to the pressure suit and a second port connected to the gas supply source;

a valve seat defined in the valve body;

a valve member shiftably mounted within the valve body, the valve member being moveable to a first position in which the valve member contacts the valve seat to thereby prevent flow communication between the first and second ports, the valve member further being moveable to a second position in which the valve member is spaced away from the valve seat to thereby permit flow communication between the first and second ports;

an actuator operatively engaging the valve member for shifting the valve member between the first and second positions, the actuator comprising a stepper motor, the stepper motor having a threaded output shaft, and wherein the valve member includes a valve stem having a female threaded member engaging the output shaft and being moveable along the output shaft as the output shaft is rotated, whereby operation of the stepper motor causes incremental movement of the valve member.

2. A life support system, comprising:

a pressure suit;

a gas supply source; and a valve assembly for controlling the pressure in the pressure suit by communicating gas between the gas supply source and the pressure suit, the valve assembly including:

a valve body having a first port connected to the pressure suit and a second port connected to the gas supply source;

a valve seat defined in the valve body;

a valve member shiftably mounted within the valve body, the valve body, the valve member being slidably mounted to a valve stem, and including means for coupling the valve member and the valve stem, the valve member being moveable to a first position in which the valve member contacts the valve seat to thereby prevent flow communication between the first and second ports, the valve member further being moveable to a second position in which the valve member is spaced away from the valve seat to thereby permit flow communication between the first and second ports;

an actuator operatively engaging the valve member for shifting the valve member between the first and second positions.

3. The life support system according to claim 2 wherein the coupling means includes a spring.

4. The life support system according to claim 2 wherein the valve stem carries a reaction element, the reaction element cooperating with the coupling means to vary a force of the valve member against the valve seat in response to movement of the valve stem by the actuator.

5. The life support system according to claim 2, wherein the actuator comprises a stepper motor, the stepper motor having a shaft operatively engaging the valve stem, the rotatable shaft being rotatable in a first direction and a second direction to thereby move the valve stem in a first direction and a second direction, respectively, and further including a stop element carried by the valve stem, the stop element being positioned on the valve stem so as to move the valve member toward the second position upon movement of the valve stem a predetermined distance in the second direction.

6. The life support system according to claim 2 wherein the valve stem is moveable bi-directionally by the actuator.

7. A life support system, comprising:

a pressure suit;

a gas supply source; and a valve assembly for controlling the pressure in the pressure suit by communicating gas between the gas supply source and the pressure suit, the valve assembly including:

a valve body having a first port connected to the pressure suit and a second port connected to the gas supply source, wherein the valve body includes a diaphragm which defines a chamber within the valve body, and further wherein at least one of the first and second ports is in flow communication with the chamber;

a valve seat defined in the valve body;

a valve member shiftably mounted within the valve body, the valve member being moveable to a first position in which the valve member contacts the valve seat to thereby prevent flow communication between the first and second ports, the valve member further being moveable to a second position in which the valve member is spaced away from the valve seat to thereby permit flow communication between the first and second ports;
an actuator operatively engaging the valve member for shifting the valve member between the first and second positions.

8. A life support system, comprising:
a pressure suit;
a gas supply source; and
a valve assembly for controlling the pressure in the pressure suit by communicating gas between the gas supply source and the pressure suit, the valve assembly including:
a valve body having a first port connected to the pressure suit and a second port connected to the gas supply source;
a valve seat defined in the valve body;
a valve member shiftably mounted within the valve body, the valve member being moveable to a first position in which the valve member contacts the valve seat to thereby prevent flow communication between the first and second ports, the valve member further being moveable to a second position in which the valve member is spaced away from the valve seat in a direction generally perpendicular to a face of the valve seat to thereby permit flow communication between the first and second ports;
an actuator operatively engaging the valve member for shifting the valve member between the first and second positions.

9. A life support system, comprising:
a pressure suit;
a gas supply source; and
a valve assembly for controlling the pressure in the pressure suit by communicating gas between the gas supply source and the pressure suit, the valve assembly including:
a valve body having a first port connected to the pressure suit and a second port connected to the gas supply source the valve body further including a third port, the third port being in flow communication with a vent;
a first valve seat defined in the valve body;
a valve member shiftably mounted within the valve body, the valve member being moveable to a first position in which the valve member contacts the valve seat to thereby prevent flow communication between the first and second ports, the valve member further being moveable to a second position in which the valve member is spaced away from the valve seat to thereby permit flow communication between the first and second ports;
a second valve seat defined in the valve body and a second valve member shiftably mounted within the valve body, the second valve member being moveable to a first position in which the second valve member contacts the second valve seat to thereby prevent flow communication between the first and third ports, the second valve member further being moveable to a second position in which the second valve member is spaced away from the second valve seat to thereby permit flow communication between the first and third ports;
an actuator operatively engaging the first valve member and the second valve member for shifting the valve members between the first and second positions.

10. The life support system according to claim 9 wherein the first and third ports are arranged generally at one side of the valve body and the second port is arranged at an opposite side of the valve body.

11. The life support system of claim 9, wherein the first and second valve members are operatively coupled to a valve stem.

12. The life support system according to claim 11 wherein the valve stem is moveable to a neutral position in which both of the first and second valve members are in their respective first positions with the first, second and third ports all isolated from each other.

13. The life support system of claim 11, wherein the first and second valve members are spaced on valve stem so as to prevent any flow communication between the second and third ports.

14. The life support system of claim 11, wherein the actuator moves the valve stem in either of a first direction and a second direction, and wherein the valve stem carries a first reaction element and a second reaction element, the first reaction element cooperating with the valve stem to incrementally vary a force of the first valve member against the first valve seat in response to movement of the valve stem in the first direction, the second reaction element cooperating with the valve stem to incrementally vary a force of the second valve member against the second valve seat in response to movement of the valve stem in the second direction.

15. The life support system of claim 9, wherein the actuator comprises a stepper motor having a rotatable threaded output shaft, and wherein the first and second valve members are operatively coupled to a valve stem, the valve stem including a female threaded member engaging the output shaft, and wherein the stepper motor is adapted to move the valve stem in a first direction and a second direction in response to rotation of the output shaft, and further including first and second stop elements carried by the valve stem, the first stop element being positioned on the valve stem so as to move the first valve member toward the second position upon movement of the valve stem a predetermined distance in the second direction, the second stop element being positioned on the valve stem so as to move the second valve member toward the second position upon movement of the valve stem a predetermined distance in the first direction.

16. The life support system of claim 9, wherein the actuator is adapted so that when the first valve member is shifted toward its respective second position the second valve member is in its respective first position, and further so that when the second valve member is shifted toward its respective second position the first valve member is in its respective first position.

17. The life support system of claim 9, wherein the valve body includes a first diaphragm which defines a first chamber within the valve body, and further includes a second diaphragm which defines a second chamber in the valve body, and further wherein the first port is in flow communication with the first and second chambers.

18. A life support system, comprising:
a pressure suit;
a gas supply source; and
a valve assembly for controlling the pressure in the pressure suit by controlling the flow of gas between the gas supply source into the pressure suit and further by controlling the flow of gas out of the pressure suit, the valve assembly including:
a valve body having a first port connected to the pressure suit, a second port connected to the gas supply source, and a third port connected to a vent;

first and second valve seats defined in the valve body;

first and second valve members shiftably mounted within the valve body, the first valve member being moveable to a first position in which the first valve member contacts the first valve seat to thereby prevent flow communication between the first and second ports, the first valve member further being moveable to a second position in which the first valve member is spaced away from the first valve seat to thereby permit flow communication between the first and second ports, the second valve member being moveable to a first position in which the second valve member contacts the second valve seat to thereby prevent flow communication between the first and third ports, the second valve member further being moveable to a second position in which the second valve member is spaced away from the second valve seat to thereby permit flow communication between the first and third ports;

an actuator operatively engaging the first and second valve members for selectively shifting each of the first and second the valve members between their respective first and second positions.

19. The life support system of claim 18, wherein the valve assembly includes a valve stem, and including a first spring operatively coupling the first valve member to the valve stem and further including a second spring operatively coupling the second valve member to the valve stem, and wherein the actuator comprises a stepper motor having a threaded output shaft, the valve stem engaging the output shaft so that the valve stem is moveable in response to operation of the stepper motor, the first spring cooperating with the first valve member and the stepper motor to incrementally vary a force of the first valve member against the first valve seat when the first valve member is in the first position, and the second spring cooperating with the second valve member and the stepper motor to incrementally vary a force of the second valve member against the second valve seat when the second valve member is in the first position.

20. A life support system, comprising:

a pressure suit;

a gas supply source; and a valve assembly for controlling the flow of gas from the gas supply source into the pressure suit, the valve assembly including:

a valve body having a first port connected to the pressure suit and a second port connected to the gas supply source;

a valve seat defined in the valve body;

a valve member shiftably mounted within the valve body, the valve member being moveable to a first position in which the valve member contacts the valve seat to thereby prevent flow communication between the first and second ports, the valve member further being moveable to a second position in which the valve member is spaced away from the valve seat to thereby permit flow communication between the first and second ports;

a valve stem shiftably mounted within the valve body;

a spring operatively coupling the valve member to the valve stem;

an actuator coupled to the valve stem and being adapted to shift the valve stem thereby shifting the valve member between the first and second positions.

21. The life support system of claim 20, wherein the actuator comprises a stepper motor having a threaded output shaft, the valve stem engaging the output shaft so that the valve stem is moveable in response to operation of the stepper motor, the spring cooperating with the valve member and the stepper motor to incrementally vary a force of the valve member against the valve seat when the valve member is in the first position.

* * * * *